3,390,138
EPOXIDES
Hans Batzer, Arlesheim, Otto Ernst, Pfeffingen, and Daniel Porret, Basel, Switzerland, assignors to Ciba Limited, Basel, Switzerland, a Swiss company
No Drawing. Continuation-in-part of application Ser. No. 63,956, Oct. 21, 1960. This application Mar. 11, 1964, Ser. No. 351,235
Claims priority, application Switzerland, Oct. 23, 1959, 79,779/59
6 Claims. (Cl. 260—78.4)

This application is a continuation-in-part of copending application 63,956, filed Oct. 21, 1960.

The present invention provides new monoepoxides of the formula

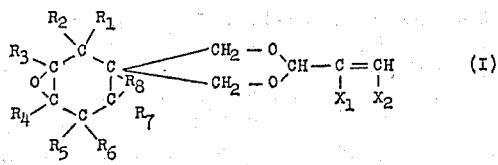

in which $R_1$ to $R_8$ each represents a monovalent substituent such as a halogen atom or an alkoxy group or an aliphatic, cycloaliphatic, araliphatic or aromatic hydrocarbon radical, preferably an alkyl radical containing 1 to 4 carbon atoms, or a hydrogen atom, where $R_1$ and $R_5$ together may also form a divalent substituent, such as a methylene group, and in which $X_1$ and $X_2$ represent hydrogen atoms or methyl groups.

To obtain the monoepoxides of the invention unsaturated acetals of the general formula

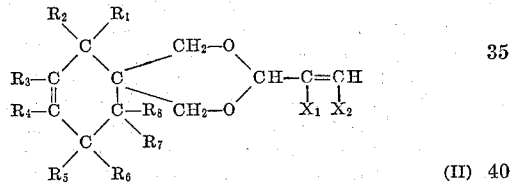

in which $R_1$ to $R_8$, $X_1$ and $X_2$ have the same meanings as in Formula (I) are treated with an epoxidising agent under conditions such that oxygen is added on only to the cycloolefinic double bond.

To obtain the starting materials of the Formula (II) an aldehyde of the formula

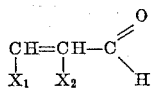 (III)

is acetalised with a dialcohol of the formula

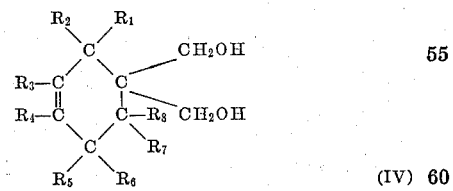

As aldehydes of the Formula (III) there may be mentioned acrolein, methacrolein and crotonic aldehyde.

Suitable dialcohols of the Formula (IV) are, for example:

1:1-bis-(hydroxymethyl)-cyclohexene-(3),
1:1-bis-(hydroxymethyl)-6-methylcyclohexene-(3),
1:1-bis-(hydroxymethyl)-2:4:6-trimethylcyclohexene-(3),
1:1-bis-(hydroxymethyl)-2:5-endomethylenecyclohexene-(3), and
1:1-bis-(hydroxymethyl)-4-chlorocyclohexene-(3).

The acetalisation can be performed in known manner, for example by heating an aldehyde of the Formula (III) with a dialcohol of the Formula (IV) in the presence of an acid catalyst, such, for example, as sulfuric acid, phosphoric acid or para-toluenesulfonic acid. In the process of the invention the acetals of the Formula (II) are treated with an epoxidising agent, the reaction conditions being selected so that only the carbon-to-carbon double bond in the cyclohexene ring is epoxidised. It is of advantage to epoxidise with the aid of an organic peracid, such as peracetic, perbenzoic, peradipic, monoperphthalic acid or a similar acid that attacks the carbon-to-carbon double bond in the olefinic side chain only under much more drastic reaction conditions that it does the cycloolefinic double bond.

In the course of the epoxidation there may be formed— apart from the monoepoxides—by side reactions, also hydrolysed epoxides, that is to say compounds in which the epoxide groups of the monoepoxide of the Formula (I) have been hydrolysed to hydroxyl groups.

It has been discovered that the presence of such by-products in general has a favourable effect on the technical properties of the cured epoxides. As a rule, it is therefore of advantage not to isolate the pure monoepoxides from the reaction mixture.

Particularly easy to manufacture are, for example, the mono-epoxides of the formula

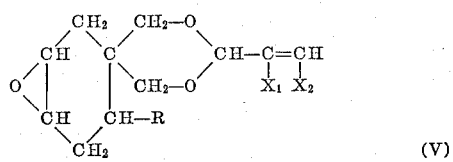 (V)

in which R represents a hydrogen atom or a lower alkyl radical, and $X_1$ and $X_2$ each represents a hydrogen atom or a methyl group.

In general, the monoepoxides of the invention are at room temperature clear liquids of low viscosity.

Unexpectedly, and in contrast to known monoepoxides such as butyl glycide, cresyl glycide, styrene oxide and the like, the products of the invention can be crosslinked and cured with the conventional curing agents in the same manner as polyepoxides.

Suitable curing agents are basic or more especially acidic compounds.

The following have proved suitable as curing agents: amines or amides, such as aliphatic and aromatic primary, secondary and tertiary amines, for example mono-, di- and tributylamines, para - phenylenediamine, bis-(para-aminophenyl) - methane, ethylenediamine, N:N-diethylethylenediamine, diethylene triamine, tetra-(hydroxyethyl) - diethylenetriamine, triethylenetetramine, tetraethylenepentamine, N:N-dimethylpropylenediamine, trimethylamine, diethylamine, triethanolamine, Mannich's bases, piperidine, piperazine, guanidine and guanidine derivatives such as phenyldiguanidine, diphenylguanidine, dicyandiamide, aniline-formaldehyde resins, urea-formaldehyde resins, melamine-formaldehyde resins, polymers of aminostyrenes, polyamides, for example those obtained by reacting aliphatic polyamines with dimerised or trimerised unsaturated fatty acids, isocyanates, isothiocyanates; polyhydric phenols, for example resorcinol, hydroquinone, bis - (4-hydroxyphenyl)-dimethylmethane, quinone, phenol-aldehyde resins, oil-modified phenol-aldehyde resins, reaction products of aluminum alcoholates or phenolates with compounds of tautomeric reaction of the type of acetoacetic esters, Friedel-Crafts catalysts, such as aluminum chloride, antimony pentachloride, tin tetrachloride, zinc chloride or boron trifluoride or complexes thereof with organic compounds; metal fluoborates, boroxines, or phosphoric acid. Preferred use is made as curing agents of polybasic carboxylic acids and anhydrides thereof, for example phthalic anhydride, methylendomethylene tetrahydrophthalic anhydride, dodecenylsuccinic anhydride, tetrahydrophthalic anhydride, hexahydrophthalic anhydride, hexachloroendomethylene tetrahydrophthalic anhydride or endomethylene tetrahydropthalic anhydride, or mixtures of said anhydrides; maleic or succinic anhydride. If desired, there may be further added an accelerator such as a tertiary amine or a strong Lewis base, for example an alkali metal alcoholate, and advantageously also polyhydroxy compounds such as hexanetriol, or glycerol.

It has been found that the new monoepoxides are advaneageously cured with carboxylic acid anhydrides in a concentration of 0.3 to 0.9 gram equivalent of anhydride groups per gram equivalent of epoxide groups.

When a basic accelerator is used, such as an alkali metal alcoholate or alkali metal salt of a carboxylic acid, up to 1.0 gram equivalent of anhydride groups may be used.

The most important use of the monoepoxides of the invention lies in their mixture with curable polyepoxides, or epoxy resins, especially as active diluents. The addition of a so-called active diluent is often desirable in casting or laminating resins or solvent-free lacquers to produce curable resin mixtures of as low a viscosity as possible that are liquid at room temperature. All known active diluents for epoxy resins such, for example, as cresyl glycide, have the serious shortcoming that they have an extremely unfavourable effect on the mechanical thermal stability of the cured resins. Most unexpectedly, it has now been observed that the monoepoxides of the invention constitute excellent active diluents by virtue of their low viscosity and, moreover, they even enhance the mechanical thermal stability of the cured resin mixtures as a rule, or at least they reduce it at worst only negligibly.

As examples of diepoxide and polyepoxide compounds preferably used together with the monoepoxides of the invention there may be mentioned: epoxidised diolefines, dienes or cyclic dienes such as butadiene dioxide, vinyl cyclohexene dioxide, 1:2:5:6-diepoxyhexane and 1:2:4:5-diepoxycyclohexane; epoxidised diolefinically unsaturated carboxylic acid esters, such as methyl - 9:10:12:13-diepoxystereate; the dimethyl ester of 6:7:10:11-diepoxyhexadecane - 1:16 - dicarboxylic acid; epoxidised compounds containing two cyclohexenyl groups, such as bis - (3:4-epoxy-cyclohexylmethyl)-succinate, bis-(3:4-epoxy - cyclohexylmethyl) - phthalate, diethyleneglycol-bis - (3:4 - epoxy-cyclohexane-carboxylate), 3:4-epoxy-cyclohexylmethyl - 3:4 - epoxy-cyclohexane-carboxylate and 3:4 - epoxy-6-methyl-cyclohexylmethyl-3:4-epoxy-6-methyl-cyclohexane-carboxylate. Furthermore basic polyepoxides such as are obtained by dehydrohalogenating reaction products of primary or secondary amines, such as n-butylamine, aniline or 4:4'-di-(mono-methylamino)-diphenyl methane, with epichlorohydrin. Further suitable are polyglycidyl esters such as are obtained by reacting a dicarboxylic acid with epichlorohydrin or dichlorohydrin in the presence of alkali. Such polyesters may be derived from aliphatic dicarboxylic acids such as oxalic, succinic, glutaric, adipic, pimelic, suberic, azelaic, sebacic acid and more especially of aromatic dicarboxylic acids such as phthalic, isophthalic, terephthalic, 2:6-naphthylene-dicarboxylic acid, diphenyl-ortho:ortho'-dicarboxylic acid, or ethylene glycol-bis-(para-carboxy-phenyl)-ether and the like. There may be mentioned, for example, diglycidyl adipate and diglycidyl phthalate, as well as diglycidyl esters of the average formula

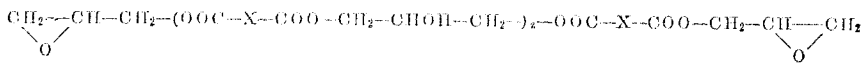

in which X represents an aromatic hydrocarbon radical, such as a phenylene radical, and z is a small integer or fraction included, for example, between 0 and 2.

Further suitable are polyglycidyl ethers such as are obtained by etherifying a polyhydric alcohol or polyphenol with epichlorohydrin or dichlorohydrin in the presence of alkali. The compounds may be derived from glycols, such as ethylene glycol, diethylene glycol, triethylene glycol, 1:2-propanediol, 1:3-propanediol, 1:4-butanediol, 1:5-pentanediol, 1:6-hexanediol, 2:4:6-hexanetriol, glycerol and more especially polyphenols such as phenol and cresol novolaks,
resorcinol,
pyrocatechol,
hydroquinone,
1:4-dihydroxynaphthalene,
bis-[4-hydroxyphenyl]-methane,
bis-[4-hydroxyphenyl]-methylphenylmethane,
bis-[4-hydroxyphenyl]-tolylmethane,
4:4'-dihydroxydiphenyl,
bis-[4-hydroxyphenyl]-sulfone and above all
2:2-bis-[4-hydroxyphenyl]-propane (bisphenol).

There may be mentioned ethylene glycol diglycidyl ethers and resorcinol diglycidyl ethers, as well as diglycidyl ethers of the average formula $$CH_2-CH-CH_2-[O-X-O-CH_2CHOH-CH_2]_z-O-X-O-CH_2-CH-CH_2$$
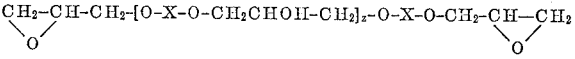

in which X represents an aromatic hydrocarbon residue, such as the phenylene residue, or the hydrocarbon residue of bisphenol, and z represents a small integer or fraction included, for example, between 0 and 2.

Accordingly, the present invention further provides curable mixtures containing a monoepoxide of the invention, preferably together with a diepoxide or polyepoxide, as well as a curing agent for epoxy resins, preferably an anhydride of a dicarboxylic or polycarboxylic acid.

The monoepoxides of the invention and their mixtures with polyepoxides and/or curing agents may further be mixed, at any stage prior to the curing operation, with fillers, plasticizers, coloring matter or the like. Suitable extenders and fillers are, for example, asphalt, bitumen, glass fibers, mica, quartz meal, cellulose, kaolin, finely distributed silicic acid (Aerosil) or metal powders.

The mixtures containing in addition to a monoepoxide of the invention a polyepoxide and/or a curing agent can be used without or with a filler, if desired in the form of a solution or emulsion, as textile assistants, laminating resins, paints, lacquers, dipping resins, casting resins, coating compositions, pore fillers, putties, adhesives, moulding compositions and the like, as well as for the manufacture of such substances. The new resins are of special importance when used as insulating compounds for electrical purposes.

In the following examples parts and percentages are by weight; the relationship between parts by weight and parts by volume is the same as that between the kilogram and the liter.

Example 1

(A) Acetal from acrolein and 1:1-bis-[hydroxymethyl]-cyclohexene-3.—A mixture of 286 parts of 1:1-bis-[hydroxymethyl]-cyclohexene-3, 118 parts of acrolein and 3 parts of sulfuric acid of 50% strength is stirred and heated in an oil bath to an external temperature of 80° C., and after 30 minutes 350 parts by volume of benzene are added dropwise. The oil bath temperature is then raised to 120–130° C. and the water eliminated by the reaction is distilled off azeotropically with the aid of a circulation distillation apparatus (see the publication by H. Batzer and co-workers in "Die Makromolekulare Chemie," volume 7 [1951], pages 84–85). After 2 hours the benzene is removed under reduced pressure. The residue (344 parts) is mixed with 1.5 parts of sodium acetate and distilled in vacuo. The acetal (3-vinyl-2:4-dioxospiro(5:5)-undecene-9) distills at 94–99° C. under a pressure of 6 mm. Hg.

Yield: 226 parts=62.5% of the theoretical.

$$n_{20}{}^D = 1.4908$$

(B) Epoxidation.—900 parts of the acetal prepared as described in Example 1(A) are dissolved in 2250 parts of benzene, treated with 100 parts of sodium acetate, and 1045 parts of peracetic acid of 40% strength are carefully stirred in dropwise at 25–30° C. After about 4 hours 100% of the calculated amount of peracetic acid has undergone reaction. The whole is then agitated in a separating funnel 3 times with 200 parts by volume of water and 4 times with 300 parts by volume of saturated sodium carbonate solution on each occasion, until an alkaline reaction has been established, dried over sodium sulfate and the benzene is distilled off under reduced pressure.

The epoxidised acetal (3 - vinyl-2:4-dioxospiro(5:5)- 9:10-epoxy-undecane) of the formula

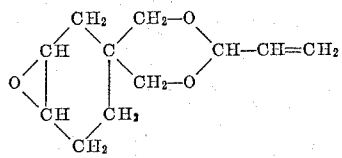

passes over at 90 to 98° C. under a pressure of 0.5 to 0.6 mm. Hg.

Yield: 739 parts=75.5% of the theoretical.

Epoxide content: 5.14 epoxide groups per kg. (theory: 5.1 epoxide groups per kg.).

Determination of double bonds: 6.0 double bonds per kg. (theory: 5.1 double bonds per kg.).

The above monoepoxide (100 parts) can be cured with phthalic anhydride (46 parts) in the presence of 2:4-dihydroxy-3-hydroxymethyl-pentane (23 parts) at 180° C. to yield a hard casting.

Example 2

(A) Acetal from crotonic aldehyde and 1:1-bis-[hydroxymethyl]-cyclohexene-3.—286 parts of bis-[hydroxymethyl]-cyclohexene-3 and 140 parts of crotonic aldehyde are condensed as described in Example 1(A) with addition of 3 parts of sulfuric acid of 50% strength and 350 parts by volume of benzene.

The acetal (3-propenyl-2:4-dioxospiro(5:5)-undecane-9) passes over at 82–89° C. under a pressure of 5 mm. Hg.

Yield: 252 parts=65% of the theoretical. $n_{20}{}^D = 1.4939$.

(B) Epoxidation.—652 parts of the acetal prepared as described in Example 2(A) are dissolved in 1680 parts by volume of benzene, treated with 70 parts of sodium acetate and epoxidised as described in Example 1(B) at 25–30° C. with 704 parts of peracetic acid of 40% strength. The epoxidised acetal (3-propenyl-2:4-dioxospiro(5:5)-9:10-epoxy-undecane) of the formula

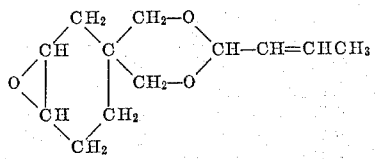

passes over at 114–118° C. under a pressure of 0.6 to 0.8 mm. Hg.

Yield: 381 parts=54% of the theoretical.

Epoxide content: 4.65 epoxide groups per kg. (theory: 4.75 epoxide groups per kg.).

Determination of double bonds: 4.3 double bonds per kg. (theory: 4.75 double bonds per kg.).

Example 3

(A) Acetal from crotonic aldehyde and 1:1-bis-[hydroxymethyl]-6-methyl-cyclohexene-3.—312 parts of 1:1-bis-[hydroxymethyl]-6-methyl-cyclohexene-3 and 140 parts of crotonic aldehyde are condensed as described in Example 1(A) with addition of 1 part of sulfuric acid of 50% strength and 350 parts by volume of benzene. The acetal (3-propenyl-7-methyl-2:4-dioxospiro(5:5) - undecene-9) passes over at 116–134° under a pressure of 5 mm. Hg.

Yield: 243 parts=58.5% of the theoretical. $n_{20}{}^D = 1.491$.

(B) Epoxidation.—832 parts of the acetal prepared as described in Example 3(A) are dissolved in 2500 parts by volume of benzene, treated with 80 parts of sodium acetate and epoxidised with 836 parts of peracetic acid of 40% strength at 25–30° C. as described in Example 1(B). The epoxidised acetal (3-propenyl-7-methyl-2:4-dioxospiro(5:5) - 9:10 - epoxy - undecane) of the formula

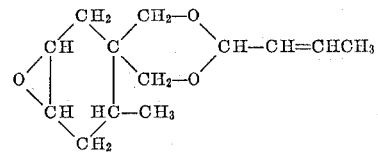

passes over at 103–113° C. under a pressure of 0.2 mm. Hg.

Yield: 371 parts=45.5% of the theoretical.

Epoxide content: 4.3 epoxide groups per kg. (theory: 4.47).

Example 4

(A) Acetal from acrolein and 2:5-endomethylene-Δ³-cyclohexene-1:1-dimethanol.—154 parts of 1:1-bis-[hydroxymethyl]-2:5-endomethylenecyclohexene-3 are dissolved with stirring at an external temperature of 50° C. in 500 cc. of benzene and treated in succession with 1 part each of zinc chloride and ortho-phosphoric acid and then with 59 parts of acrolein. The mixture is stirred for 20 minutes at 50° C. and then rapidly raised in a preheated oil bath to an external temperature of 120° C., while distilling off the reaction water azeotropically with the aid of a circulation distillation apparatus (see the publication by H. Batzer and co-workers in "Die Makromolekulare Chemie," volume 7 [1951], pages 84–85). After about 1 hour 18 parts of water have been separated in this manner. During the cooling, 15 parts of anhydrous sodium acetate are added, the whole is filtered, and the benzene is removed in a circulation evaporator. The slightly yellowish residue (210 parts) is distilled off under reduced pressure through a Vigreux column. The water-clear acetal passes over at 94–95° C. under a pressure of 0.5 mm. Hg.

Yield: 168.5 parts=87.5% of the theoretical. $n_{20}{}^D = 1.4987$.

Determination of double bonds: 10.02 (theory: 10.42) double bonds per kg.

Analysis.—$C_{12}H_{16}O_2$; molecular weight 192.25. Found: C, 75.30%; H, 8.38%. Calculated: C, 74.97%; H, 8.39%.

(B) Epoxidation.—A solution of 96 parts of the acetal prepared as described in Example 1(A) in 300 parts of benzene is treated with 20 parts of sodium acetate, and 100 parts of peracetic acid of 42% strength are carefully stirred in dropwise at 35–40° C. After about 50 minutes, 102% of the calculated amount of peracetic acid has undergone reaction. The reaction mixture is then cooled to 20° C., shaken three times with 50 parts of water and twice with 50 parts of saturated sodium carbonate solution on each occasion, until an alkaline reaction has been established then dried over sodium sulfate, filtered, and the benzene is distilled off under reduced pressure. Yield: 98 parts (=94% of the theoretical) of a water-clear crude product containing 124% of double bonds (calculated on monoepoxide). The monoepoxide of the formula

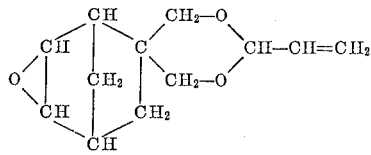

passes over at 96–99° C. under a pressure of 0.3 mm. Hg.

Yield: 68.5 parts=66% of the theoretical. $n_{20}{}^D$ =1.5115.

Determination of double bonds: 4.4 double bonds (theory: 4.8) per kg.

Analysis.—$C_{12}H_{16}O_3$; molecular weight 208.25. Found: C, 69.5%; H, 7.92%. Calculated: C, 69.21%; H, 7.74%.

Example 5

(A) Acetal from methacrolein and $\Delta^3$-cyclohexene-1:1-dimethanol.—284 parts of 1:1-bis-[hydroxymethyl]-cyclohexene-3 are dissolved in 700 parts of benzene with stirring at an external temperature of 50° C. 2 parts each of zinc chloride and ortho-phosphoric acid and then 163 parts of methacrolein of 90% strength are added and the whole is stirred for 20 minutes at 50° C., then rapidly raised to an external temperature of about 120° C. and the water of reaction is distilled off azeotropically with the aid of a circulation distillation apparatus. Within one hour 35.5 parts of water are separated in this manner. After cooling, 10 parts of sodium acetate are added, the whole is filtered and the benzene is removed under reduced pressure. The residue (388 parts) is distilled off in vacuo through a Vigreux column. The acetal passes over at 54 to 58° C. under a pressure of 0.1 mm. Hg.

Yield: 309 parts=80% of the theoretical. $n_{20}{}^D$=1.4910.

Analysis.—$C_{12}H_{18}O_2$; molecular weight 194.26. Found: C, 74.46%; H, 9.31%. Calculated: C, 74.16%; H, 9.34%.

(B) Epoxidation.—A solution of 194 parts of the acetal prepared as described in Example 2(A) in 400 parts of benzene is treated with 40 parts of sodium acetate and 215 parts of peracetic acid of 42% strength are stirred in dropwise at 35 to 40° C. After 2½ hours 102% of the calculated amount of peracetic acid has been reacted. 1000 parts of benzene are added and the mixture is agitated three times with 150 parts of water and twice with 50 parts of saturated sodium carbonate solution on each occasion, until an alkaline reaction has been established. The benzene solution is once again washed with 100 parts of water, dried over sodium sulfate and filtered and the benzene is removed under reduced pressure. Yield: 202 parts (=96% of the theoretical) of a water-clear crude product containing 4.75 epoxide groups per kg. The monoepoxide of the formula

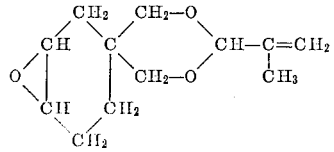

passes over at 86 to 94° C. under a pressure of 0.8 mm. Hg.

Yield: 140 parts=67% of the theoretical. $n_{20}{}^D$=1.4937.

Determination of epoxide groups: 5.05 epoxide groups (theory: 4.74) per kg.

Analysis.—$C_{12}H_{18}O_3$; molecular weight 210.26. Found: C, 68.33%; H, 8.40%. Calculated: C, 68.54%; H, 8.63%.

Example 6

Test specimens of a polyglycidyl ether resin which is solid at room temperature and contains 2.55 epoxide equivalents per kg., prepared by reacting epichlorohydrin with bis-[4-hydroxyphenyl]-dimethylmethane in the presence of alkali (resin A), and test specimens of resin mixtures obtained by dissolving at about 70° C. a monoepoxide resin prepared as described in Example 1 (resin D) in resin A, are melted with phthalic anhydride as curing agent at 120–125° C., using in each case per equivalent of epoxide groups of resin A and, respectively, of the resin mixture $A+D$, 0.85 equivalent of anhydride groups.

Each mixture is cast at about 120° C. in an aluminum mould (40 x 10 x 140 mm.) and cured for 24 hours at 140° C.

The viscosity of the resin A and of the resin mixture $A+D$, the pot life of the resin+curing agent mixtures as well as the properties of the cured castings are shown in the following table:

| Specimen | Resin A, parts | Resin D, parts | Viscosity at 23° C. of resin A and resin mixture A+D, in cp. | Pot life of resin plus curing agent mixtures up to 1,500 cp. at 120° C. in minutes | Bending strength, kg./mm.² | Thermal stability according to Martens DIN in ° C. |
|---|---|---|---|---|---|---|
| 1 | 100 | 0 | Solid | 65 | 14.0 | 100 |
| 2 | 80 | 20 | Viscid | 86 | 15.6 | 100 |
| 3 | 60 | 40 | 100,000 | 117 | 14.0 | 99 |

Example 7

1.75 parts of a sodium alcoholate, prepared by dissolving 0.82 parts of sodium metal at about 120° C. in 100 parts of 2:4-dihydroxy-3-hydroxymethyl-pentane, are dissolved in 100 parts each of resin A described in Example 6 and of the resin mixture $A+D$ described in Example 4 at about 70° C. (specimen 1) and, respectively, at about 50° (specimen 2) and at room temperature (specimen 3). In each case 1.0 equivalent of phthalic anhydride per equivalent of epoxide groups is fused in as curing agent at 120–125° C. The resulting mixtures are cast at about 120° C. in aluminum moulds as described in Example 6 and each casting is cured for 24 hours at 140° C. The resulting cured castings have the properties shown in the following table:

| Specimen | Resin A, parts | Resin, D, parts | Bending strength, kg./mm.² | Thermal stability according to Martens DIN in ° C. |
|---|---|---|---|---|
| 1 | 100 | 0 | 14.3 | 94 |
| 2 | 80 | 20 | 15.9 | 98 |
| 3 | 60 | 40 | 13.5 | 101 |

Example 8

A polyglycidyl ether resin which is liquid at room temperature, has a viscosity of 12,000 cp. at 23° C. and contains 5.5 epoxide equivalents per kg. and has been prepared by reacting epichlorohydrin with bis-[4-hydroxyphenyl]-dimethylmethane in the presence of alkali (resin B) is mixed at room temperature in two different ratios with a monoepoxy resin (resin D) prepared as described in Example 1. These mixtures are melted with phthalic anhydride as curing agent at 120–125° C., using in each case 0.85 equivalent of anhydride groups per equivalent of epoxide groups.

As described in Example 6, each resulting mixture is cast in aluminum tubes and cured for 24 hours at 140° C.

The viscosities of the resin mixtures and the properties of the cured castings are shown in the following table:

| Specimen | Resin B, parts | Resin D, parts | Viscosity of resin mixture B+D at 23° C. in cp. | Bending strength, kg./mm.$^2$ | Thermal stability according to Martens DIN in ° C. |
| --- | --- | --- | --- | --- | --- |
| 1 | 90 | 10 | 5,400 | 16.1 | 112 |
| 2 | 70 | 30 | 1,450 | 16.7 | 113 |

Example 9

In Experiment 1 1.75 parts of the sodium alcoholate described in Example 7 are dissolved at room temperature or a slightly higher temperature in 100 parts of the cycloaliphatic polyepoxy resin (resin C) of the formula

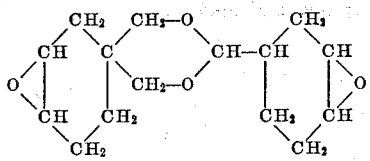

containing 6.2 equivalents of epoxide groups per kg.; in experiment 2 in 100 parts of a mixture of epoxy resins consisting of 80 parts of resin C and 20 parts of the monoepoxide compound described in Example 2, and in experiment 3 in 100 parts of a mixture of epoxy resins consisting of 80 parts of resin C and 20 parts of the monoepoxide compound described in Example 3.

In each case the curing agent used is 1.0 equivalent of phthalic acid anhydride per equivalent of epoxide groups, fused in at 120–125° C.

As described in Example 6, a first portion of each mixture prepared in this manner is cast in aluminum moulds and cured for 24 hours at 140° C., while a second portion is used for cementing tests. For the latter purpose degreased and polished strips of aluminum sheet marketed under the trade name "Anticorodal B" (170 x 25 x 1.5 mm.; 10 mm. overlap) are cemented together and cured for 24 hours at 120° C.

The viscosities of resin C and of the resin mixtures as well as the properties of the cured castings and cemented aluminum strips are shown in the following table:

| Experiment | Viscosity of resin C and of the resin mixture at 23° C. in cp. | Impact bending strength, kg./cm.$^2$ | Bending strength, kg./mm.$^2$ | Thermal stability according to Martens DIN in ° C. | Shear strength, kg./mm.$^2$ |
| --- | --- | --- | --- | --- | --- |
| 1 | >100,000 | 5.8 | 7.0 | 177 | 0.7 |
| 2 | 38,000 | 9.1 | 9.4 | 163 | 0.8 |
| 3 | 84,000 | 5.0 | 6.7 | 169 | 0.9 |

A third portion each of specimens 2 and 3 is cast in a layer about 0.1 mm. thick on glass plates and cured for 24 hours at 140° C. The resulting faultless, hard films prove stable on immersion for one hour at room temperature in 5 N-sulfuric acid, 5 N-sodium hydroxide solution, water, acetone and chlorobenzene.

What is claimed is:

1. A hardenable composition of matter which comprises (1) a 1,2-epoxide compound having a 1,2-epoxy equivalency greater than 1, (2) a monoepoxide of the formula

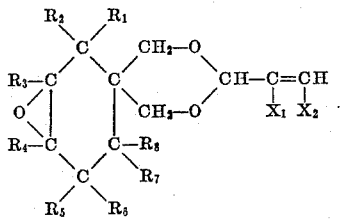

in which $R_1$ and $R_5$ taken together form a member selected from the group consisting of two hydrogen atoms, two lower alkyl radicals of 1 to 4 carbon atoms and the methylene group, $R_2$, $R_3$, $R_4$, $R_6$, $R_7$, $R_8$ and $R_9$, each represent a member selected from the group consisting of hydrogen and lower alkyl of 1 to 4 carbon atoms, and $X_1$ and $X_2$ each are members selected from the group consisting of hydrogen and methyl, and (3) a member selected from the group consisting of dicarboxylic and polycarboxylic acid anhydrides.

2. A hardenable composition of matter which comprises (1) a 1,2-epoxide compound having a 1,2-epoxy equivalency greater than 1, (2) a monoepoxide of the formula

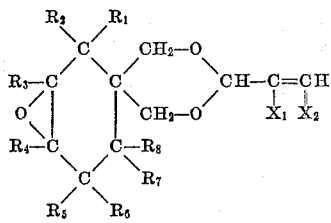

in which $R_1$ and $R_5$ taken together form a member selected from the group consisting of two hydrogen atoms, two lower alkyl radicals of 1 to 4 carbon atoms and the methylene group, $R_2$, $R_3$, $R_4$, $R_6$, $R_7$, $R_8$ and $R_9$, each represent a member selected from the group consisting of hydrogen and lower alkyl of 1 to 4 carbon atoms, and $X_1$ and $X_2$ each are members selected from the group consisting of hydrogen and methyl, and (3) a member selected from the group consisting of dicarboxylic and polycarboxylic acid anhydrides, and (4) an alkali metal alcoholate of a polyhydric aliphatic saturated alcohol.

3. A hardenable composition of matter which comprises (1) a 1,2-epoxide compound having a 1,2-epoxy equivalency greater than 1, (2) the monoepoxide of the formula

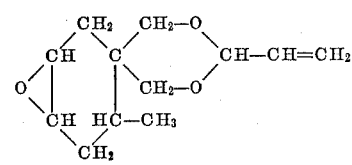

and (3) a member selected from the group consisting of dicarboxylic and polycarboxylic acid anhydrides.

4. A hardenable composition of matter which comprises (1) a 1,2-epoxide compound having a 1,2-epoxy equivalency greater than 1, (2) the monoepoxide of the formula and (3) a member selected from the group consisting of dicarboxylic and polycarboxylic acid anhydrides.

5. A hardenable composition of matter which comprises (1) a 1,2-epoxide compound having a 1,2-epoxy equivalency greater than 1, (2) the monoepoxide of the formula

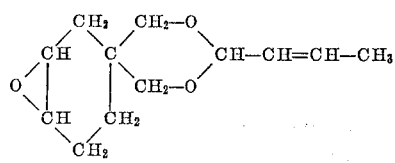

and (3) a member selected from the group consisting of dicarboxylic and polycarboxylic acid anhydrides.

6. A hardenable composition of matter which comprises (1) a 1,2-epoxide compound having a 1,2-epoxy equivalency greater than 1, (2) the monoepoxide of the formula

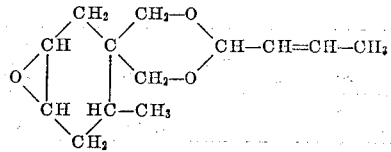

and (3) a member selected from the group consisting of dicarboxylic and polycarboxylic acid anhydrides.

No references cited.

JOSEPH L. SCHOFER, *Primary Examiner.*

J. KIGHT, *Assistant Examiner.*